Sept. 22, 1964        S. CASTRO        3,149,488
STRAIN GAUGE MEASURING APPARATUS
Filed Aug. 13, 1962        2 Sheets-Sheet 1
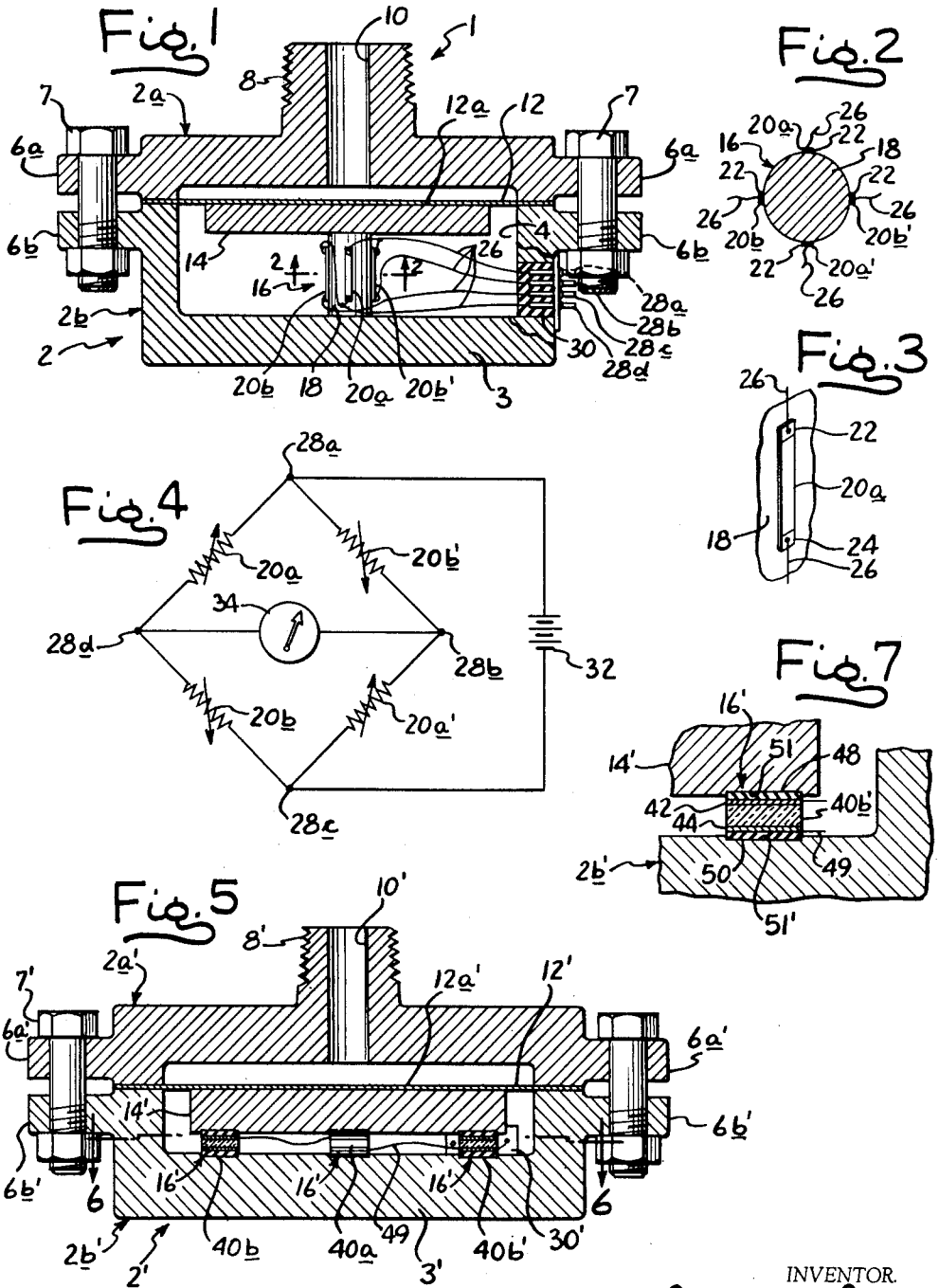
INVENTOR.
SALVADOR CASTRO
BY
ATTYS.

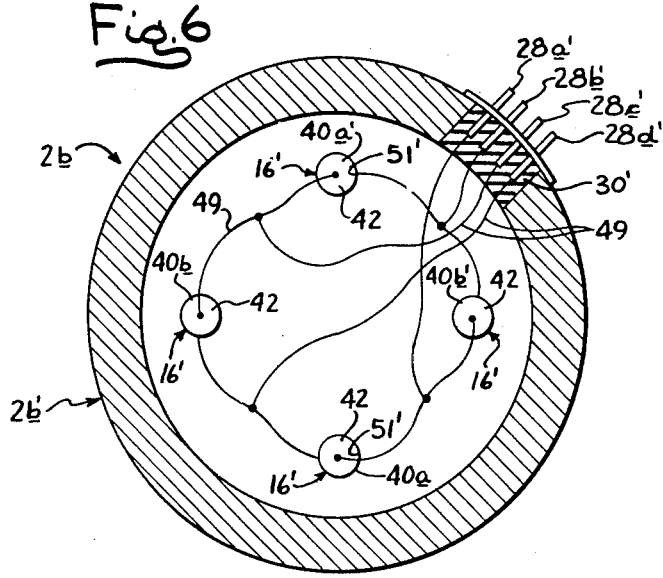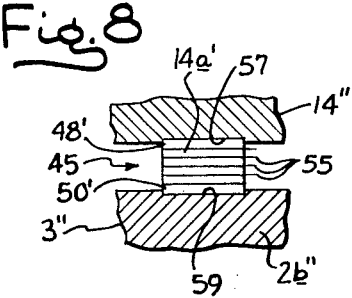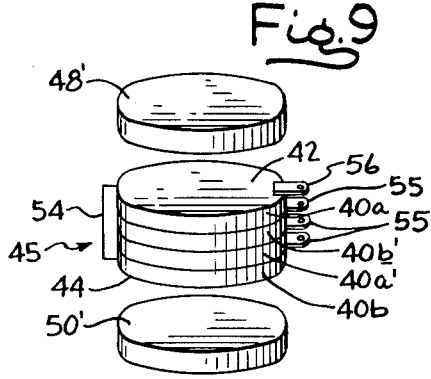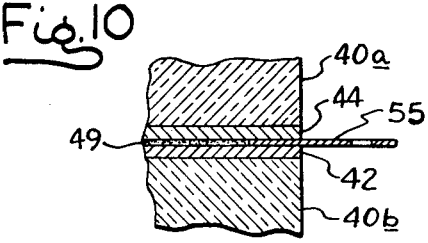

United States Patent Office 3,149,488
Patented Sept. 22, 1964

3,149,488
STRAIN GAUGE MEASURING APPARATUS
Salvador Castro, Levittown, Pa., assignor to Gulton Industries, Inc., Metuchen, N.J., a corporation of New Jersey
Filed Aug. 13, 1962, Ser. No. 216,441
3 Claims. (Cl. 73—141)

This invention relates to strain gauge measuring apparatus which utilizes strain sensing units providing a varying resistance with varying stress. The most common form of strain sensing unit used in such apparatus is made of metal strain gauge resistance wire. In one form of strain measuring apparatus using metal resistance wire, four wires formed into individual sensing elements are adhesively secured to a member to be stressed in a manner which places two of the elements under tension and two of the elements under compression. The sensing elements are then connected to form a Wheatstone bridge circuit. The sensing elements are mounted on the stressed member in such a way that the two sensing elements placed in tension form one pair of opposite (as distinguished from adjacent) arms of the bridge and the other two sensing elements placed in compression form the other opposite arms of the bridge. This arrangement results in maximum bridge sensitivity.

One disadvantage in the use of metal resistance wire is that it has a low gauge factor, that is a small resistance change per unit force and, in the form in which they have heretofore been made, has a very low sensitivity to high frequency force components. The problem of a small gauge factor can be overcome by utilizing piezo-resistive semi-conductor materials having high gauge factors, such as silicon and germanium doped to provide relatively large resistivities. These materials have gauge factors 50 to 80 or more times that of metal strain gauge resistance wire. One limiting factor, however, is that such semi-conductor materials have a very low strength when placed under tension, the strength of such materials being as much as a hundredfold weaker in tension than in compression. These materials cannot, therefore, be readily used in the highly sensitive Wheatstone bridge arrangement described above where two of the elements are placed in tension and two are placed in compression.

It is, accordingly, one of the objects of the invention to provide strain gauge measuring apparatus which has a markedly greater sensitivity to both static and high frequency forces than strain gauge resistance wire strain gauge measuring apparatus heretofore developed. A related object of the invention is to provide highly sensitive strain gauge measuring apparatus as just described which utilizes high gauge factor semi-conductor materials weak in tension.

Another one of the objects of the invention is to provide strain gauge measuring apparatus as just described which is particularly adapted for measuring pressure.

An all encompassing object of the present invention is to provide strain gauge measuring apparatus as described which is rugged, reliable, and is of simple and economical construction.

In accordance with one aspect of the present invention, a Wheatstone bridge circuit is formed from four piezo-resistive semi-conductor crystal elements preferably silicon or germanium crystal elements, where two of the crystal elements are formed or cut along a crystal axis which provides a positive gauge factor (a decreasing resistance with increasing compression) and two of the crystal elements are formed or cut along a crystal axis which provides a negative gauge factor (increasing resistance with increasing compression). For example, P type silicon crystals cut or grown along a 1-1-1 crystal axis have a positive gauge factor, N type silicon cut or grown along a 1-0-0 crystal axis have a negative gauge factor. The postive gauge factor, semi-conductor, crystal elements are connected to form one pair of opposite arms of the bridge and the negative gauge factor semi-conductor crystal elements are connected to form the other opposite arms of the bridge. All four semi-conductor crystal elements are mounted between a pair of relatively movable force applying members so that the semi-conductor crystal elements are positioned to receive an increasing compressive force as one of the force applying members is moved or forced toward the other of same. Thus, as a given compressive force is applied simultaneously to the four semiconductor crystal elements just described, the resistance of two of them will increase while the resistance of the other two will decrease to produce a maximum change in the output of the bridge for a given input force. Since the semi-conductor crystal elements are placed only under compression, the maximum strength characteristics of the semi-conductor crystal elements are utilized.

Other aspects of the invention relate to particular physical arrangements of the positive and negative gauge factor semi-conductor crystal elements. For example, one important specific aspect of the invention is the arrangement of the positive and negative gauge factor semi-conductor crystal elements in a manner to form a rugged and compact monolithic stack of elements which can be simply used in a number of different compressive force applying environments and forms a complete Wheatstone bridge circuit by the simple expedient of connecting a source of energizing potential to a pair of input terminals thereof and a voltage indicating device for sensing the unbalancing of the bridge circuit to a pair of output terminals thereof. In this form of the invention, each of the semi-conductor elements is preferably a thin wafer-like element with its most strain sensitive axis (that is the axis which corresponds to the crystal axis along which it was formed or cut) extending in the direction of the smallest dimension or thickness thereof. Each of the wafer-like semi-conductor elements has a pair of electrodes on the opposite end faces thereof in the form of a metalized coating or the like. These semi-conductor elements are stacked so that they are spaced in the direction of their thin dimension, and so that the positive gauge factor semi-conductor elements are separated by a negative gauge factor semi-conductor element. The confronting electrodes of the semi-conductor elements are physically and electrically interconnected, such as by soldering or brazing the electrodes together to form a stiff integrated body which has a high resonant frequency so that it is sensitive to high frequency force components. Suitable conductors or terminals are connected to the interfaces of the electrodes of the various semi-conductor elements of the stack and the outer electrodes of the outermost semi-conductor elements of the stack are electrically connected together and to a fourth conductor or terminal. The four terminals referred to then form the four junctures of a Wheatstone bridge circuit which can be readily connected to a source of energizing potential and a voltage measuring device to complete the measuring circuit.

Other objects, advantages and features of the present invention will become apparent upon making reference to the specification to follow, the claims and the drawings wherein:

FIG. 1 is a sectional view through one form of the present invention constructed to form a pressure measuring apparatus;

FIG. 2 is a fragmentary, enlarged transverse sectional view through FIG. 1, taken substantially along the line 2—2 therein;

FIG. 3 is a fragmentary, enlarged perspective view of one of the semi-conductor crystal elements shown in FIGS. 1 and 2;

FIG. 4 is an electrical circuit diagram showing the Wheatstone circuit formed by the semi-conductor crystal elements forming part of the apparatus shown in FIGS. 1 and 2;

FIG. 5 is a sectional view through a modified form of the present invention;

FIG. 6 is a transverse sectional view through the apparatus shown in FIG. 5, taken substantially along the line 6—6 therein;

FIG. 7 is a fragmentary, enlarged view of a portion of FIG. 5;

FIG. 8 is a fragmentary, sectional view through a still further modified form of the present invention;

FIG. 9 is an enlarged perspective view of a stack of semi-conductor crystal elements forming a part of FIG. 7 and including an exploded view of a pair of end insulating members utilized therewith; and FIG. 10 is a greatly enlarged fragmentary section through a pair of semi-conductor crystal elements forming part of the stack of elements shown in FIG. 8.

Referring now to the form of the invention shown in FIGS. 1 and 2, the pressure measuring apparatus 1 there shown is adapted to be electrically connected to external equipment to be described which form therewith a Wheatstone bridge circuit shown in FIG. 4. The apparatus 1 includes a cylindrical housing generally indicated by reference numeral 2 including two separable sections 2a and 2b defining therebetween a generally cylindrical cavity 4. The housing sections 2a and 2b have flanged portions 6a and 6b which may be secured together by screws or bolts 7. The housing section 2a has a threaded neck 8 adapted to be threadedly connected to a complementary fitting (not shown) which forms part of a pressurized system whose pressure is to be measured. The threaded neck 8 has a longitudinal open-ended central bore 10 which opens onto the cavity 4 of the housing 2.

Sandwiched between the housing sections 2a and 2b is a diaphragm-forming member 12 which is supported only at the perimeter thereof so as to provide an axially flexible central portion 12a. The axially flexible central portion 12a has, in the illustrated embodiment of the invention, a backing member 14 secured thereto for movement therewith. A semi-conductor assembly generally indicated by reference numeral 16 is sandwiched between the backing member 14 and an end wall 3 of the housing section 2b.

When the neck 8 of the housing 2 is secured to a source of pressure to be measured, the pressure involved is applied through the bore 10 against the outside of the diaphragm-forming member 12 to place the semi-conductor assembly 16 under compression. The various forms of the invention to be described are similar except for the construction of the semi-conductor portion thereof.

The semi-conductor assembly 16 illustrated in FIGS. 1 and 2 comprises a cylindrical support post 18 made of metal which directly receives a compressive force from the diaphragm-forming member 12. Secured at equally spaced points around the circumference of the cylindrical support post 18 by an insulating adhesive are four elongated semi-conductor crystal elements 20a, 20a', 20b and 20b'. The semi-conductor crystal elements 20a, 20a', 20b and 20b' are preferably made of the same piezoresistive semi-conductor materials, such as N or P type silicon or germanium doped in a well known manner to provide a desired resistivity. Assuming the semi-conductor material is P type silicon, the crystal elements 20a and 20a' are cut along a 1–1–1 axis extending parallel to the length thereof. Such a silicon crystal has a positive gauge factor, that is the resistance thereof decreases with increasing compressive force applied longitudinally thereof. In the form of the invention shown in FIG. 1, this compressive force is transmitted to the crystal elements through the medium of the support post 18 to which these members are adhesively secured with their longitudinal or crystal axis extending parallel to the longitudinal axis of the support post 18. The N type silicon crystal elements 20b and 20b' are cut along a 1-0-0 crystal axis extending parallel to the long dimension thereof which provides a negative gauge factor, that is an increasing resistance with increasing compressive force longitudinally thereof.

Each of the crystal elements has a pair of electrodes 22 and 24 at the opposite ends thereof (FIG. 3), each electrode in this form of the invention being, for example, a thin deposit of metal along a narrow strip applied to the side face of the element. Conductors 26 are soldered or otherwise secured to the electrodes 22 and 24. The conductors 26 interconnect the semi-conductor elements in the manner illustrated in FIG. 4 which shows the elements connected into a loop or bridge circuit with the positive gauge factor semi-conductor elements 20a and 20a' electrically separated by the negative gauge factors semi-conductor elements 20b and 20b'. In effect these connections form a Wheatstone bridge circuit where the positive gauge factor semi-conductor elements form one opposite pair of arms of the bridge and the negative gauge factor semi-conductor elements form the other opposite arms of the bridge. The four points of juncture of the bridge arms extend to separate terminals 28a, 28b, 28c and 28d anchored in a block of non-conductive material 30 suitably imbedded or anchored in the walls of the housing section 2b. The terminals 28a through 28d project beyond the walls of the housing section 2b to form terminal posts to which are connected a source of direct current (D.C.) energizing potential 32 and a suitable voltage sensing device 34 such as a voltmeter. The source of energizing potential 32 is connected to the opposite junctures or corners of the bridge connected to the terminals 28a and 28c, and the voltmeter 34 is connected to the other opposite junctures or corners of the bridge connected to the terminals 28b and 28d.

With the arrangement illustrated, it is apparent that with an increasing compressive force the resistance of the opposite bridge arms 20a and 20a' will increase while the resistance of the opposite bridge arms 20b and 20b' will decrease, to accentuate the charge in the output of the bridge for a given variation of compressive force.

By way of example rather than by way of limitation, each of the semi-conductor elements 20a, 20a', 20b and 20b' may be an elongated crystal element of rectangular cross section having a length in the order of one-half inch, a width in the order of .020 inch and a thickness in the order of .003 inch. The resistivity may be in the order of 1 ohm centimeter. As indicated, the dimensions and resistivity of the semi-conductor elements may vary widely, the exact selection of dimensions and resistivity depending upon the particular application involved.

Reference may now be made to the embodiment of the invention disclosed in FIGS. 5 through 7. As previously indicated, much of the housing construction of this form of the invention is similar to that just described in connection with FIG. 1 and corresponding elements are therein given corresponding reference numbers with a prime (') added thereto. The only visible difference in these housings is that the housing section 2b' of the embodiment of FIGS. 5 through 7 is a much shallower housing. Also, instead of the integral semi-conductor assembly 16 shown in FIG. 1, the form of the invention shown in FIGS. 5 through 7 utilizes four separated cylindrical semi-conductor units 16' each including a single thin disc-shaped semi-conductor crystal 40a, 40a', 40b or 40b' having end face electrodes 42 and 44 and a pair of insulating discs 48 and 50. The semi-conductor units are compressed between the backing member 14 of the diaphragm-forming member 12' and the housing section end wall 3'. The confronting faces of the backing member 14' and the housing end wall 3' each may be provided with depressions 51 and 51' centered 90° apart along a circle concentric with the housing 2' in which the end portion of the insulating discs 48 and 50 are positioned. Assuming that the different parts of the housing 2' are made of metal, the insulating discs 48 and 50 at the ends of the semi-conductor crystals insulate the electrodes 42 and 44 therefrom. The semi-conductor crystals 40a and 40a' have a positive gauge factor and the semi-conductor elements 40b and 40b' have a negative gauge factor. The crystal axis of the semi-conductor elements extend transversely of opposite end faces thereof. Thus, in the case of P type silicon, a line extending between the end faces of the semi-conductor crystal elements 40a or 40a' extends along the 1-1-1 crystal axis and the corresponding line associated with the semi-conductor crystal elements 40b or 40b' extends along the 1-0-0 crystal axis of N type silicon.

Suitable conductors 49 extend from the end face electrodes 42 and 44 of the semi-conductor crystal elements 40a, 40a', 40b and 40b' to form a bridge circuit which is identical to that shown in FIG. 4 previously described in this specification. The conductors also extend to external circuit connecting terminals 28a', 28b', 28c' and 28d' embedded in an insulating block 30' in the bottom housing section 2b'.

By way of example only, the semi-conductor crystal elements 40a, 40b, 40a' and 40b' may have a diameter of ¼ of an inch and a thickness of 1/32 of an inch. With such small semiconductor elements, to obtain a practical resistance value (e.g. 300 ohms) much higher resistivities are necessary than in the case of the elongated crystals of FIGS. 1-3. Doped P type silicon materials are available having resistivities of 500 ohm centimeters and higher which would be satisfactory for most applications using the disc-shaped elements.

Refer now to the form of the invention shown in FIGS. 8 to 10 which involve only a modification of the arrangement of the semi-conductor crystal elements. In this form of the invention, the semi-conductor crystal elements are similar to the elements 40a, 40a', 40b and 40b' in the embodiment of the invention just described except that they are physically interconnected to form a monolithic stack 45 of elements. In this form of the invention, separate conductors are not necessary to interconnect all of the various semi-conductor crystal elements as in the case of the previously described forms of the invention. The semi-conductor crystal elements are stacked one on top of the other with the positive gauge factor elements 40a and 40a' separated by a negative gauge factor semi-conductor element 40b. The confronting electrodes 42 and 44 of the contiguous semi-conductor crystal elements are physically and electrically connected together in any suitable way, as by a brazing or soldering illustrated by a soldering or brazing layer 49 in FIG. 10. Interposed between each pair of contiguous electrodes is a terminal strip 55 which projects beyond the sides of the stack to form a convenient soldering post. The outer electrode 42 of the uppermost semi-conductor crystal element 40a and the outer electrode 44 of the bottom-most semi-conductor crystal element 40b are interconnected by a suitable conductor 54. A terminal strip 56 similar to the terminal strips 55 is physically and electrically connected to the electrode 42 of the uppermost semi-conductor crystal element 40a.

The stack of semi-conductor elements are sandwiched between the center of a backing member 14" and an end wall 3" of a housing (not shown) which may be substantially identical to the housing shown in FIG. 1 or 5. Recesses 57 and 59 are provided in the center portions of the backing member 14" and the end wall 3" in which the outer portions of the stack 45 of the semi-conductor crystal elements are positioned. A pair of insulating discs 48' and 50' may be interposed between the stack of discs 45 and the walls of recesses 57-59 to insulate the outer electrodes of the stack of semi-conductor elements from the backing member 14" and end wall 3".

The various forms of the present invention have thus provided extremely sensitive and rugged apparatus for measuring pressure or other force applied to the semi-conductor crystal elements.

It should be understood that numerous modifications may be made in the specific forms of the invention described above without deviating from the broader aspects of the invention. For example, the various forms of the invention are designed to measure pressure. Obviously, other forms can be measured by suitably connecting the force to be measured to the diaphragm-forming members 12, 12', etc. or by omitting such diaphragm-forming members and otherwise coupling the force involved to the semi-conductor crystal elements to place the same under compression.

What I claim as new and desire to protect by Letters Patent of the United States is:

1. Force measuring apparatus comprising: a first pair of piezo-resistive semi-conductor crystal elements having a positive gauge factor for a force applied to opposite ends thereof, a second pair of piezo-resistive semi-conductor crystal elements having a negative gauge factor for a force applied to opposite ends thereof, each of said piezo-resistive crystal elements being a thin wafer-like element with the most pressure sensitive axis oriented in the direction of the smallest dimension or thickness thereof and having electrodes on the opposite end faces thereof, said piezo-resistive elements being electrically and physically interconnected to form a monolithic stack of elements where the semi-conductor elements are spaced in the direction of their thickness, the positive gauge factor semi-conductor elements being separated by a negative gauge factor semi-conductor element, and each of the three pairs of confronting electrodes being electrically and physically interconnected and the outer electrodes of the outermost semi-conductor elements being electrically connected together, and three terminal conductor means respectively extending from and electrically connected to the three electrically connected pairs of confronting electrodes of the stack of semi-conductor elements and a terminal conductor means extending from and electrically connected to the connected together outer electrodes of the outermost semi-conductor elements.

2. Force measuring apparatus comprising: a first pair of piezo-resistive semi-conductor crystal elements having a positive gauge factor for a force applied to opposite ends thereof, a second pair of piezo-resistive semi-conductor crystal elements having a negative gauge factor for a force applied to opposite ends thereof, each of said piezo-resistive crystal elements being a thin wafer-like element with the most pressure sensitive axis oriented in the direction of the smallest dimension or thickness thereof and having electrodes on the opposite end faces thereof, said piezo-resistive elements being electrically and physical interconnected to form a monolithic stack of elements where the semi-conductor elements are spaced in the direction of their thickness, the positive gauge factor semi-conductor elements being separated by a negative gauge factor semi-conductor element, each of the three pairs of confronting electrodes being electrically and physically interconnected and the outer electrodes of the outermost semi-conductor elements being electrically connected together, and three connecting conductors means respectively extending from and electrically connected to the three electrically connected pairs of confronting electrodes of the stack of semi-conductor elements and a connecting conductor means extending from and electrically connected to the connected together outer electrodes of the outermost semi-conductor elements, a pair of relatively movable force applying members between which are sandwiched said semi-conductor elements, the longitudinal axis of said stack of semi-conductor elements extending transversely of said relatively movable force applying members, means for applying a force to be measured to at least one of said members to force the latter member toward the other of same, a source of energizing potential coupled between a pair of said connecting conductor means associated with non-contiguous semi-conductor elements in said stack, and bridge unbalance indicating means coupled to the other pair of connecting conductor means to form with said source of energizing potential and the semi-conductor elements a Wheatstone bridge circuit.

3. Force measuring apparatus comprising: a first pair of piezo-resistive semi-conductor crystal elements having a positive gauge factor for a force applied to opposite ends thereof, a second pair of piezo-resistive semi-conductor crystal elements having a negative gauge factor for a force applied to opposite ends thereof, each of said piezo-resistive crystal elements being a thin wafer-like element with the most pressure sensitive axis oriented in the direction of the smallest dimension or thickness thereof and having electrodes on the opposite end faces thereof, connecting conductor means respectively electrically connected to the electrodes at the outer end forces of said semi-conductor elements for forming a Wheatstone bridge circuit where the positive gauge factor elements form one opposite pair of bridge arms and the negative gauge factor elements form another opposite pair of bridge arms, a pair of relatively movable force applying members between which are sandwiched said semi-conductor elements forming a stack of such elements, the thin dimension of said stack of semi-conductor elements extending transversely of said relatively movable force applying members, means for applying a force to be measured to at least one of said members to force a latter member toward the other of same, a source of energizing potential coupled between opposite corners of the bridge circuit, and bridge unbalance indicating means coupled between the other opposite corners of the bridge circuit.

References Cited in the file of this patent

UNITED STATES PATENTS

| 2,569,987 | Frondel | Oct. 2, 1951 |
| 2,767,974 | Ballard et al | Oct. 23, 1956 |
| 3,034,345 | Mason | May 15, 1962 |
| 3,049,685 | Wright | Aug. 14, 1962 |
| 3,057,202 | Dumas | Oct. 9, 1962 |

FOREIGN PATENTS

| 1,069,011 | France | Feb. 10, 1954 |
| 1,067,240 | Germany | Oct. 15, 1959 |

OTHER REFERENCES

Sanchez et al.: "Instrument Society of America Conference, Instrument-Automation Conference and Exhibit," Winter (January) and Fall (September) 1961 Conference preprint No. 46-LA61, Sept. 15, 1961, pages 6, 10 and 14 relied on, total pages 19.